US007844290B2

(12) United States Patent
Park

(10) Patent No.: US 7,844,290 B2
(45) Date of Patent: Nov. 30, 2010

(54) METHOD FOR ESTABLISHING CALL CONNECTION IN WIRELESS TERMINAL

(75) Inventor: Jong-Man Park, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 827 days.

(21) Appl. No.: 11/706,855

(22) Filed: Feb. 15, 2007

(65) Prior Publication Data

US 2007/0207808 A1 Sep. 6, 2007

(30) Foreign Application Priority Data

Feb. 15, 2006 (KR) .................. 10-2006-0014671

(51) Int. Cl.
*H04B 7/00* (2006.01)
(52) U.S. Cl. .................. 455/512; 455/451; 455/551; 455/565
(58) Field of Classification Search .............. 455/428, 455/445, 512, 451, 551, 565
See application file for complete search history.

(56) References Cited

U.S. PATENT DOCUMENTS

| 5,615,249 | A | * | 3/1997 | Solondz ................ 455/450 |
| 5,878,344 | A | * | 3/1999 | Zicker .................. 455/426.1 |
| 5,887,259 | A | * | 3/1999 | Zicker et al. ............ 455/434 |
| 6,038,449 | A | * | 3/2000 | Corriveau et al. ........ 455/439 |
| 6,058,307 | A | * | 5/2000 | Garner ................. 455/428 |
| 6,208,865 | B1 | * | 3/2001 | Veerasamy ............. 455/450 |
| 6,594,492 | B2 | * | 7/2003 | Choi et al. ............. 455/436 |
| 7,024,203 | B1 | * | 4/2006 | Naghian ............... 455/453 |
| 7,206,593 | B1 | * | 4/2007 | Yarkosky et al. ......... 455/517 |
| 7,349,333 | B2 | * | 3/2008 | Zellner ................ 370/229 |
| 7,558,588 | B2 | * | 7/2009 | To et al. ............... 455/512 |
| 7,565,161 | B2 | * | 7/2009 | Sliva .................. 455/512 |
| 2004/0101123 | A1 | * | 5/2004 | Garcia ................ 379/220.01 |

FOREIGN PATENT DOCUMENTS

| KR | 1999-0046380 | * | 7/1999 |
| KR | 19999-0046380 | | 7/1999 |
| KR | 1020000000003 | | 1/2000 |
| KR | 1020020009999 | | 2/2002 |
| KR | 1020030016616 | | 3/2003 |
| KR | 1020040026339 | | 3/2004 |

* cited by examiner

*Primary Examiner*—Nick Corsaro
*Assistant Examiner*—Sowmini Nair
(74) *Attorney, Agent, or Firm*—The Farrell Law Firm, LLP

(57) ABSTRACT

Disclosed is a method for establishing a call connection in a wireless terminal, which can make a call connection using one line number when a call connection fails through another line number in a wireless terminal subscribing to a service in which the portable terminal uses two line numbers. The method includes receiving call release signals from a mobile switching center with respect to a call request of the wireless terminal; reattempting the call request in the wireless terminal with respect to the mobile switching center using a line number having priority, when the call release signal is received from the mobile switching center to the wireless terminal; and assigning resources from a resource pool used for another purpose so as to establish the call connection to the line number having priority when the mobile switching center receives the call request, which uses the line number having the priority, from the wireless terminal again.

9 Claims, 3 Drawing Sheets

METHOD FOR ESTABLISHING CALL CONNECTION IN WIRELESS TERMINAL

PRIORITY

This application claims priority to application entitled "Method For Establishing Call Connection In Wireless Terminal" filed with the Korean Intellectual Property Office on Feb. 15, 2006 and assigned Ser. No. 2006-14671, the contents of which are incorporated herein by reference.

BACKGROUND OF THE INVENTION

1. Field of the Invention

The present invention relates to a method for establishing a call connection in a wireless terminal, and more particularly to a method for establishing a call connection in a wireless terminal, which can make a call connection using one line number when a call connection fails through another line number in a wireless terminal subscribing to a service in which the portable terminal uses two line numbers.

2. Description of the Related Art

An Alternative Line Service (ALS) is one of the available additional services in a global system for mobile communications (GSM) scheme, and uses a general voice call while providing two line numbers to a user so that the user can use communication services through two lines.

The ALS technology selects and uses any one line number of the two line numbers, and uses one International Mobile Subscriber Identity so as to identify two Mobile Subscriber Integrated Service Digital Numbers (MSISDN) and the respective subscriptions.

In the case where a subscriber identity module (SIM) card supports Common Personal Handset Specification (CPHS), the SIM card is used with reference to Dynamic_flag 1 and 2 in order to use the ALS. If the Dynamic_flag 1 is "zero", the SIM card is used through a primary line number. On the other hand, if the Dynamic_flag 1 is "one", the SIM card is used through an auxiliary line number. The SIM card generally has PIN 1 used for setting a password, and PIN 2 used for changing the value of a certain security. It is possible to control the security against the change of the number of the ALS using the value of the PIN 2.

Furthermore, a separate ring tone can be assigned to each of the two numbers of the ALS.

The user of the wireless terminal who subscribes to the ALS described above can experience failure of call requests, which are frequently caused by the limited nature of resources due to a rapid increasing of wireless terminals. In the above-mentioned case, even though technology is advancing in order to solve the call request problem, the user is sometimes burdened because of the need to subscribe to certain services with payment of expensive monthly charges.

SUMMARY OF THE INVENTION

Accordingly, the present invention has been made to solve at least the above-mentioned problems occurring in the prior art, and it is an aspect of the present invention to provide a method for establishing a call connection in a wireless terminal, which can establish a call connection using one line number when a call connection fails through another line number in a wireless terminal subscribing to a service in which the portable terminal uses two line numbers.

In order to accomplish this and other aspects of the present invention, there is provided a method for establishing a call connection in a wireless terminal which can use at least two line numbers, which includes receiving call release signals from a mobile switching center with respect to a call request of the wireless terminal; reattempting the call request in the wireless terminal with respect to the mobile switching center using a second line number having priority, when the call release signal is received from the mobile switching center; and assigning resources from a resource pool used for another purpose so as to establish the call connection to the second line number having priority when the mobile switching center receives the call request from the wireless terminal again.

There is also provided a method for establishing a call connection in a wireless terminal which can use at least two line numbers, which includes receiving call release signals from a mobile switching center with respect to a call request of the wireless terminal; transmitting a first message from the wireless terminal to the mobile switching center, which notifies the mobile switching center of the use of premium service capable of reattempting the call request by using a second line number having priority, among at least two numbers, when the call release signals is received from the mobile switching center; assigning a dedicated channel to the wireless terminal by means of the mobile switching center, when the first message is received from the wireless terminal; transmitting a second message, which notifies the mobile switching center of the call request using the second line number with priority, from the wireless terminal to the mobile switching center when the dedicated channel is assigned to the wireless terminal by means of the mobile switching center; and assigning resources from a resource pool used for another purpose so as to establish the call connection to the second line number having the priority when the mobile switching center receives the second message from the wireless terminal.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
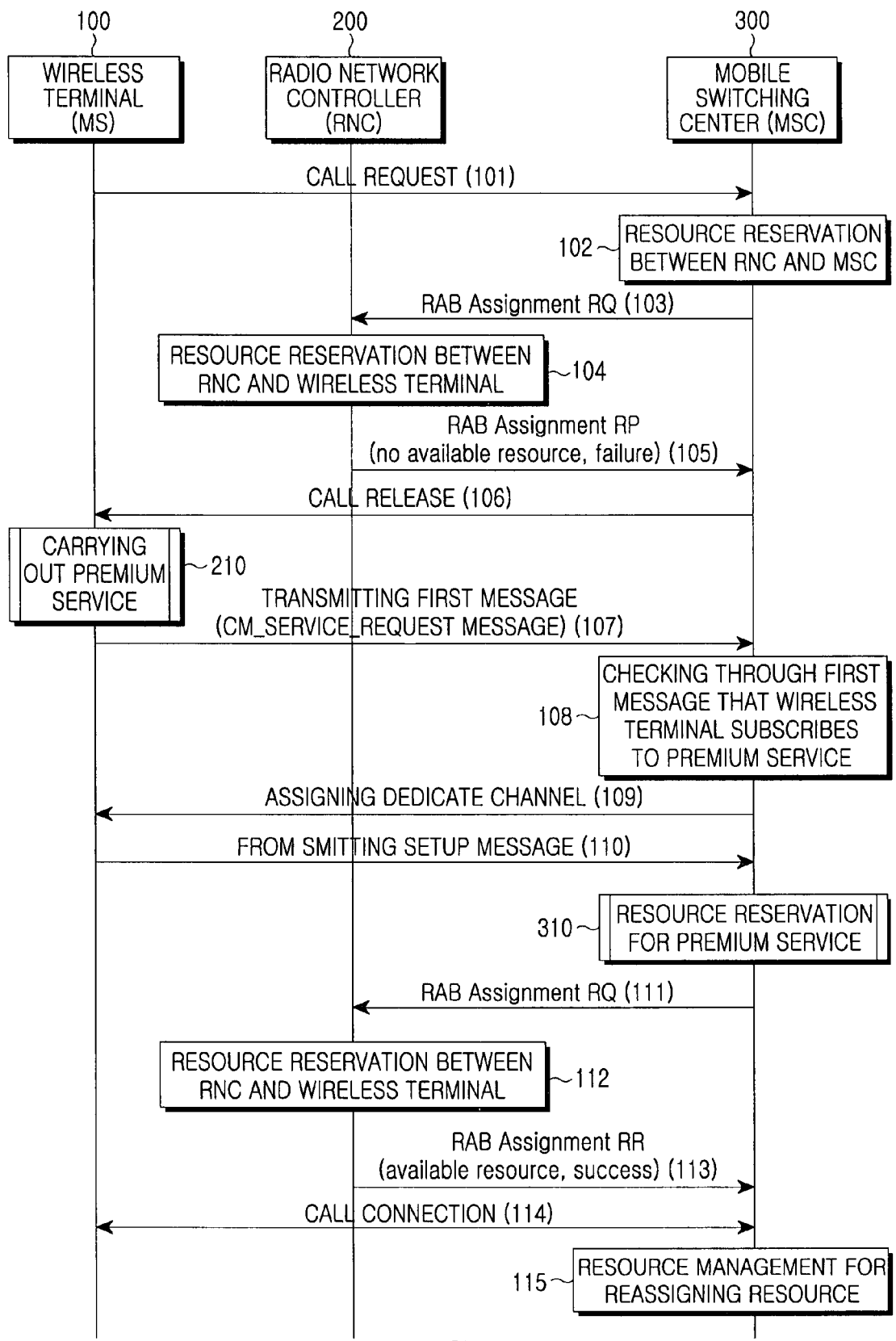
FIG. 1 a block diagram illustrating processes for establishing a call connection in a wireless terminal according to the present invention.

Hereinafter, a preferred embodiment of the present invention will be described in detail with reference to the accompanying drawings. The same reference numerals are used to denote identical structural elements throughout the description and the accompanying drawings.

The present invention will be described assuming that an alternative line number service using two line numbers, for which a wireless terminal subscribes, is an alternative line service.

Referring to FIG. 1, when the wireless terminal 100 establishes a call request with respect to the MSC 300 in step 101, the MSC 300 instructs a Radio Network Controller (RNC) to assign resources from a resource pool for the wireless terminal 100 to use during communications, and performs a resource reservation between the MSC 300 and the RNC 200, at step 102.

Then, when the MSC 300 transmits to the RNC 200 a Radio Access Bearer (RAB) Assignment Request (RQ) message, which requires a radio channel setting between the MSC 300 and the wireless terminal 100, the RNC 200 reserves the resources between the wireless terminal 100 and the RNC 200 at step 104.

When the radio channel is not set due to the limitations of the radio resources in the resource pool, the RNC 200 transmits an RAB Assignment Response (RP) message, which notifies the MSC of the failure of the radio channel setting due to the unavailability of system resources, to the MSC 300 at step 105.

The MSC 300, which receives the RAB Assignment RP message notifying the MSC of the failure of the radio channel setting from the RNC 200, transmits the wireless terminal 100 a message notifying the wireless terminal of a call release to at step 106.

The wireless terminal, which receives the message notifying the wireless terminal of the call release from the MSC 300, recognizes the call release due to the unavailability of the resources and performs a premium service at step 210. The step 210 of performing the premium service will be described in detail with reference to FIG. 2.

Figure 2:
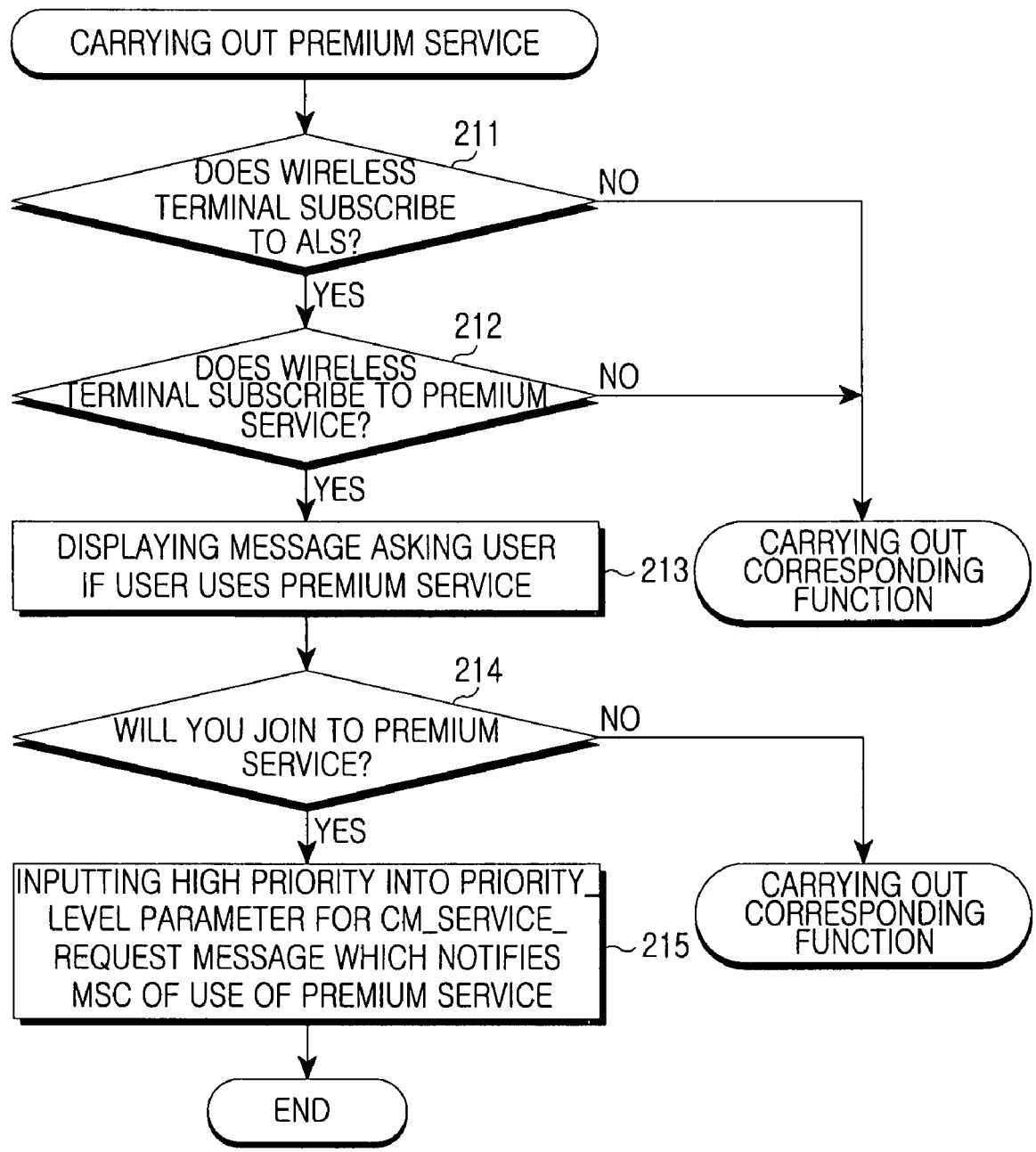
FIG. 2 is a flowchart illustrating processes for carrying out a premium service in the wireless terminal of FIG. 1.

Referring to FIG. 2, a controller of the wireless terminal checks the Service Profile (SP) so as to identify if the wireless terminal subscribes to the ALS in which the wireless terminal uses two line numbers. As the result of determination of the SP, if the wireless terminal subscribes to the ALS, the controller of the wireless terminal identifies the subscription of the wireless terminal and determines if the wireless terminal subscribes to a premium service in which the call request is carried out again by using one line number having a priority over the two line numbers for the ALS, at step 211. Specifically, since a primary line number of the two line numbers for the ALS fails to make the call connection requested in step 101, the controller checks the Customer Service Profile (CSP) of a residual auxiliary line number and determines if the auxiliary line number is set to carry out the call request again with priority.

If the wireless terminal subscribes to the premium service, the controller detects the subscription of the premium service at step 212, and notifies the user of the failure of communication while displaying a message asking if the communication is to be retried through the premium service, at step 213.

When the user of the wireless terminal selects the use of the premium service, the controller 110 detects the selection for the use of the premium service at step 214, and inputs "high priority" into a parameter at a priority level of CM_SERVICE_REQUEST which is the first message notifying the MSC of the use of the premium service, and transmits the first message to the MSC 300 at step 215 and step 107 of FIG. 1.

When the CM_SERVICE_REQUEST, which is the first message notifying the MSC of the use of the premium service, is received from the wireless terminal, the MSC 300 identifies that the wireless terminal 100 subscribes to the premium service through the "high priority" input into the parameter for the priority level of the CM_SERVICE_REQUEST, at step 108 in FIG. 1, and assigns a dedicated channel to the wireless terminal 100 at step 109. When the dedicated channel is assigned by the MSC 300, the controller of the wireless terminal transmits a setup message at step 110, which is a second message notifying the MSC of the call request through the auxiliary line number, to the MSC 300.

The controller sets an auxiliary speech to an Information Trade Capability (ITC) of a bearer capability of the setup message, and notifies the MSC of the call request through the auxiliary line number.

After the setup message is received from the wireless terminal, the MSC 300 performs the resource reservation for the premium service of the wireless terminal at step 310. The resource reservation for the premium service at step 310 will be described in detail with reference to FIG. 3.

Figure 3:
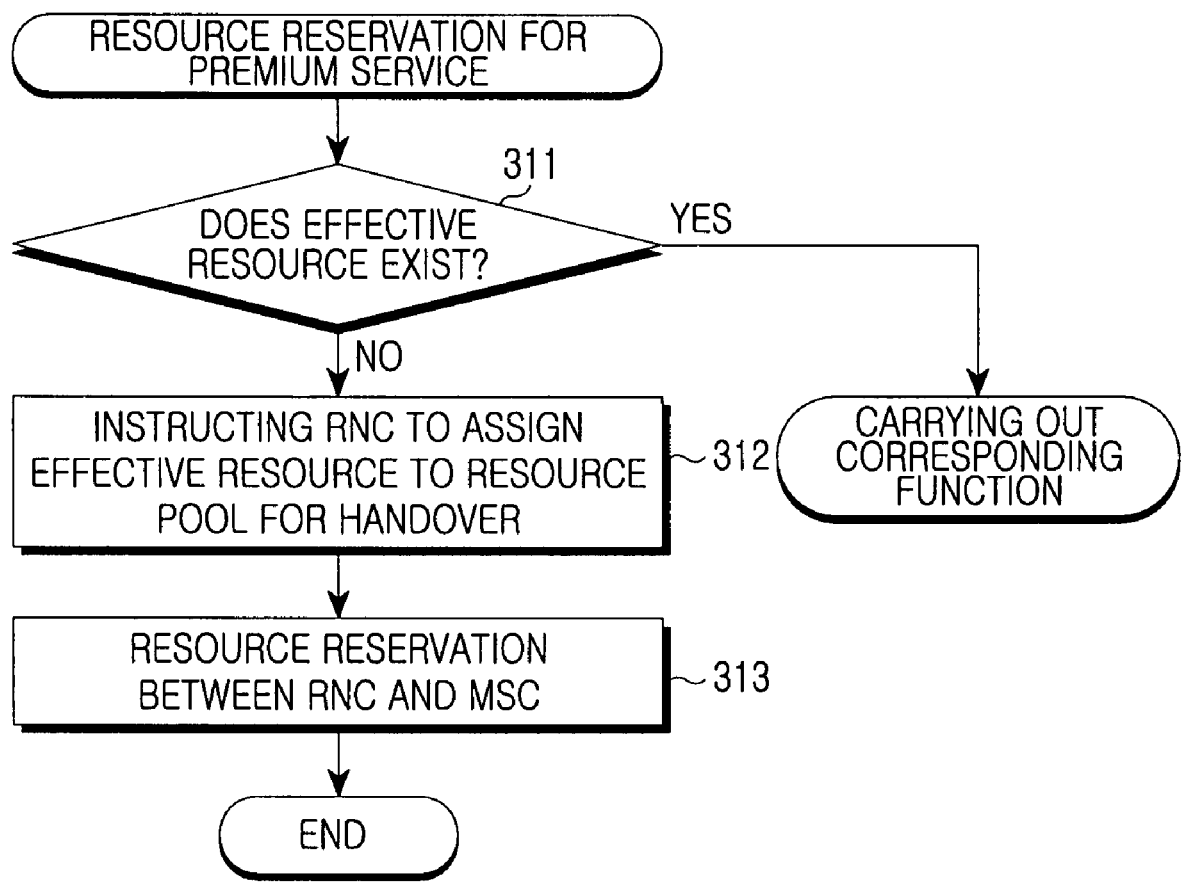
FIG. 3 is a flowchart illustrating processes for reserving resources for the premium services in a Mobile Switching Center (MSC) of FIG. 1.

Referring to FIG. 3, the MSC 300, which has identified that the wireless terminal subscribed for the premium service, determines if the effective resource exists in the resource pool for the communication. If the effective resource does not exist in the resource pool for communication, the MSC 300 detects absence of the effective resource at step 311, and instructs the wireless terminal to assign an effective resource of a resource pool for another purpose, for example, a resource pool for handover, to the RNC 200 at step 312. Then, the MSC 300 performs a resource reservation between the MSC 300 and the RNC 200 at step 313. When the MSC 300 transmits an RAB Assignment RQ message requiring setting of a radio channel between the wireless terminal 100 and the MSC 300 at step 111 of FIG. 1, the RNC 200 carries out a resource reservation between the RNC 200 and the wireless terminal 100 through the effective resource of the resource pool for the handover at step 112.

When the resource reservation between the wireless terminal and the MSC 300 is performed, the RNC 200 transmits the RAB Assignment RP message, which notifies the MSC of the allocation of the radio channel, to the MSC 300 at step 113. After the RAB Assignment RP message, which notifies the MSC of the allocation of the radio channel, is received from the RNC 200, the MSC 300 transmits a message, which notifies the wireless terminal of the call connection, to the wireless terminal 100 at step 114.

While the wireless terminal 100 receives the assigned resource of the resource pool for the handover and makes the call connection, the MSC 300 checks if the resource is created in the resource pool for the communication. When the effective resource is created in the resource pool for the communication, the MSC 300 switches and assigns the effective resources, created in the resource pool for the communication, to the resource pool for the handover.

As described above, according the present invention, since the wireless terminal makes the call connection based on a re-call request using the line number having priority, it is possible to provide differentiated service so as to easily make the call connection even though the call request is refused due to the unavailability of radio resources. Further, the present invention can provide the differentiated service to a provider, while giving a user a service in which a refused call can be connected.

Furthermore, the present invention can provide the ALS using parameters prescribed in an ALS standard and 3GPP 24.008 provision in consideration of a novel priority, thereby providing communication service through update of software in the wireless terminal and the MSC without a great alteration of software.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for establishing a call connection in a wireless terminal having at least two line numbers, the method comprising the steps of:

receiving call release signals from a mobile switching center with respect to a call request using a first line number of the wireless terminal;

reattempting the call request using a second line number having priority, when the call release signal is received from the mobile switching center; and reassigning a resource from a resource pool so as to establish the call connection using the second line number having priority when the mobile switching center receives the call request to use the second line number from the wireless terminal.

2. The method as claimed in claim 1, wherein the step of reattempting the call request, comprises:

determining if the wireless terminal subscribes to an alternative line number service in which at least two line numbers are available, when the wireless terminal receives the call release from the mobile switching center;

determining if the wireless terminal subscribes to a premium service in which the call request can be performed by using the second line number having priority among at least two line numbers, if the wireless terminal subscribes for the alternative line number service;

requesting permission from a user to use the premium service, if the wireless terminal subscribes for the premium service; and transmitting a first message to the mobile switching center when the user permits use of the premium service.

3. The method as claimed in claim 2, wherein the alternative line number service is an Alternative Line Service (ALS).

4. The method as claimed in claim 1, wherein the step of establishing the call connection using the second line number having the priority, comprises:

assigning a dedicated channel to the wireless terminal by the mobile switching center, when the mobile switching center receives the first message, which notifies the mobile switching center of the use of the premium service capable of carrying out the call request by using the second line number having the priority, from the wireless terminal;

transmitting a second message notifying the wireless terminal of the call request using the second line number having the priority, when the mobile switching center assigns the dedicated channel to the wireless terminal; and reassigning a resource of a resource pool so as to establish the call connection using the second line number with the priority when the mobile switching center receives the second message from the wireless terminal.

5. The method as claimed in claim 1, further comprising assigning the resource of the resource pool to another resource pool, if the resource pool has sufficient resources when the call is connected to the mobile switching center.

6. The method as claimed in claim 1, wherein the another resource pool includes resources for performing a handover.

7. A method for establishing a call connection in a wireless terminal having at least two line numbers, the method comprising the steps of:

receiving call release signals from a mobile switching center with respect to a call request using a first line number of the wireless terminal;

transmitting a first message from the wireless terminal to the mobile switching center, which notifies the mobile switching center of the use of a premium service capable of reattempting the call request by using a second line number having priority, among at least two numbers, when the call release signals is received from the mobile switching center to the wireless terminal;

assigning a dedicated channel to the wireless terminal by means of the mobile switching center, when the first message is received from the wireless terminal;

transmitting a second message, which notifies the mobile switching center of the call request using the second line number with priority, from the wireless terminal to the mobile switching center when the dedicated channel is assigned to the wireless terminal by means of the mobile switching center; and assigning resources from a resource pool so as to establish the call connection to the second line number having the priority when the mobile switching center receives the second message from the wireless terminal.

8. The method as claimed in claim 7, further comprising assigning the resources of the resource pool to another resource pool if the resource pool is has sufficient resources when the call is connected to the mobile switching center.

9. The method as claimed in claim 7, wherein the another resource pool includes a resource pool for performing a handover.

* * * * *